United States Patent
Amano

(10) Patent No.: US 8,995,726 B2
(45) Date of Patent: Mar. 31, 2015

(54) APPARATUS AND METHOD FOR BIOMETRIC AUTHENTICATION

(75) Inventor: Kazuhiko Amano, Tokyo-to (JP)

(73) Assignee: Seiko Epson Corporation, Tokyo (JP)

( * ) Notice: Subject to any disclaimer, the term of this patent is extended or adjusted under 35 U.S.C. 154(b) by 980 days.

(21) Appl. No.: 12/080,498

(22) Filed: Apr. 3, 2008

(65) Prior Publication Data
US 2008/0247607 A1 Oct. 9, 2008

(30) Foreign Application Priority Data

Apr. 6, 2007 (JP) ................. 2007-100318

(51) Int. Cl.
G06K 9/00 (2006.01)
G06K 9/46 (2006.01)

(52) U.S. Cl.
CPC ........ G06K 9/00375 (2013.01); G06K 9/00885 (2013.01); G06K 9/46 (2013.01); G06K 2009/0006 (2013.01); G06K 2009/00932 (2013.01)
USPC ........... 382/115; 382/123; 382/154; 382/190; 600/407

(58) Field of Classification Search
USPC ................. 382/115, 123–125, 190, 254, 279; 600/476, 407
See application file for complete search history.

(56) References Cited

U.S. PATENT DOCUMENTS

| | | | |
|---|---|---|---|
| 6,301,375 B1* | 10/2001 | Choi | 382/115 |
| 7,317,843 B2* | 1/2008 | Sun et al. | 382/274 |
| 8,105,239 B2 | 1/2012 | Specht | |
| 2002/0016533 A1 | 2/2002 | Marchitto et al. | |
| 2002/0183624 A1* | 12/2002 | Rowe et al. | 600/476 |
| 2004/0057605 A1* | 3/2004 | Kono et al. | 382/115 |
| 2006/0050409 A1* | 3/2006 | George et al. | 359/708 |
| 2008/0075330 A1* | 3/2008 | Matsumura et al. | 382/115 |

(Continued)

FOREIGN PATENT DOCUMENTS

JP 2003331272 A 11/2003
JP 3549795 4/2004

(Continued)

Primary Examiner — Kim Vu
Assistant Examiner — Michael Vanchy, Jr.
(74) Attorney, Agent, or Firm — Nutter McClennen & Fish LLP; John J. Penny, Jr.; Joshua I. Rudawitz

(57) ABSTRACT

A biometric authentication system includes: an image acquisition unit for acquiring an image of a living body; a light source with a predetermined wavelength band; an authentication information storage unit for, if light is emitted by the light source, setting a predetermined distance for a first distance to a first image acquired by the image acquisition unit in a depth direction so that quality of the first image is improved, extracting a first feature to be used to perform biometric authentication from the first image whose quality has been improved, and storing authentication information regarding the first feature; a feature extraction unit for, if light is emitted by the light source when performing authentication, setting the predetermined distance for a second distance to a second image acquired by the image acquisition unit in the depth direction so that quality of the second image is improved, and extracting a second feature for biometric authentication from the second image whose quality has been improved; and a comparison unit for comparing the authentication information regarding the first feature and authentication information regarding the second feature.

9 Claims, 7 Drawing Sheets

(56) References Cited

U.S. PATENT DOCUMENTS

| | | |
|---|---|---|
| 2008/0107309 A1* | 5/2008 | Cerni .......................... 382/115 |
| 2008/0175444 A1* | 7/2008 | Maro et al. ................... 382/115 |
| 2008/0221519 A1 | 9/2008 | Schwach et al. |
| 2010/0049017 A1* | 2/2010 | LeBoeuf et al. ............. 600/310 |

FOREIGN PATENT DOCUMENTS

| | | |
|---|---|---|
| JP | 2006098340 A | 4/2006 |
| JP | 2007-007073 | 1/2007 |
| WO | WO2007-001025 | 1/2007 |

\* cited by examiner

APPARATUS AND METHOD FOR BIOMETRIC AUTHENTICATION

The entire disclosure of Japanese Patent Application No. 2007-100318, filed Apr. 6, 2007 is expressly incorporated by reference herein.

BACKGROUND

1. Technical Field

The present invention relates to a biometric authentication system and a biometric authentication method for performing identity authentication using biometric information obtained by acquiring an image of a blood vessel or the like.

2. Related Art

In order to verify that a user is an authorized one, biometric authentication in which biometric information such as a fingerprint, an iris, or a vein pattern of the authorized user is used has been performed in recent years (for example, see Japanese Patent No. 3549795). Accordingly, various biometric information acquisition systems have been used. Known among these biometric information acquisition systems are ones including a light source for radiating light and a light receptor for receiving light. Such a system obtains biometric information by causing the light source to emit light onto a living body, causing the light receptor to receive the light from the living body, and converting the received light into an electric signal.

As our environment is becoming flooded with electronic apparatuses requiring authentication, such as cell phones and personal computers, large-size, high power-consuming biometric information acquisition systems have been avoided. On the other hand, higher authentication accuracies have been demanded as people raise their security awareness; therefore, improvements in accuracy of biometric information are also required.

When performing biometric authentication, a comparison is made between features of a part of a living body that are previously registered and data obtained by measuring a living body when performing authentication and then a determination whether they are matched is made. Methods for measuring a living body include transmission type in which light transmitted through a living body is received and reflection type in which light reflected by a living body is received. These types differ in positional relation among a light source, a light receptor, and a living body interposed therebetween. If a living body is measured when registering authentication data or when performing authentication using the authentication data, a transmission image or a reflection image significantly deteriorates due to strong dispersion inside the living body or on the body surface. Therefore, no more than the presence or absence of an image of the target blood vessel or a rough position of the blood vessel is currently known from an image obtained using a typical transmission or reflection method. If an appropriate point spread function (PSF) is obtained, the deterioration of an image due to dispersion is alleviated by performing deconvolution. However, if an image acquisition system employing, for example, percutaneous fluoroscopy is used, there occurs a problem that the PSF significantly varies depending on the depth of the targeted blood vessel and thus the authentication result varies.

SUMMARY

An advantage of the invention is to provide a biometric authentication system and a biometric authentication method for performing identity authentication with accuracy and reliability using biometric information obtained by acquiring an image of a blood vessel.

According to a first aspect of the invention, a biometric authentication system includes: an image acquisition unit for acquiring an image of a living body; a light source with a predetermined wavelength band; an authentication information storage unit for, if light is emitted by the light source, setting a predetermined distance for a first distance to a first image acquired by the image acquisition unit in a depth direction so that quality of the first image is improved, extracting a first feature for biometric authentication from the first image whose quality has been improved, and storing authentication information regarding the first feature; a feature extraction unit for, if light is emitted by the light source when performing authentication, setting the predetermined distance for a second distance to a second image acquired by the image acquisition unit in the depth direction so that quality of the second image is improved, and extracting a second feature for biometric authentication from the second image whose quality has been improved; and a comparison unit for comparing the authentication information regarding the first feature and authentication information regarding the second feature.

According to this configuration, positioning is performed before comparing the pieces of authentication information. This allows an image acquisition element having a small image acquisition area to be used. Also, since the number of pixels required becomes smaller, the amount of image processing for making a comparison is reduced, whereby the processing speed is improved. Further, a highly-accurate authentication determination is made.

In the biometric authentication system according to the first aspect of the invention, the first and second distances in the depth direction may be each a distance from a skin to a vein or an artery used to perform biometric authentication.

According to this configuration, the quality of each obtained image is improved, so the comparison process is performed with reliability and accuracy.

In the biometric authentication system according to the first aspect of the invention, the quality of the first image and the quality of the second image may be improved by performing a deconvolution process using a point spread function.

According to a second aspect of the invention, a method for performing biometric authentication in a biometric authentication system having an image acquisition unit for acquiring an image of a living body and a light source with a predetermined wavelength band includes: if light is emitted by the light source, setting a predetermined distance for a first distance to a first image acquired by the image acquisition unit in a depth direction so that quality of the first image is improved, extracting a first feature for biometric authentication from the first image whose quality has been improved, and storing authentication information regarding the first feature; if light is emitted by the light source when performing authentication, setting the predetermined distance for a second distance to a second image acquired by the image acquisition unit in the depth direction so that quality of the second image is improved, and extracting a second feature for biometric authentication from the second image whose quality has been improved; and comparing the authentication information regarding the first feature and authentication information regarding the second feature.

According to this configuration, positioning is performed before comparing the pieces of authentication information. This allows an image acquisition element having a small image acquisition area to be used. Also, since the number of pixels required becomes smaller, the amount of image processing for making a comparison is reduced, whereby the processing speed is improved. Further, a highly-accurate authentication determination is made.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
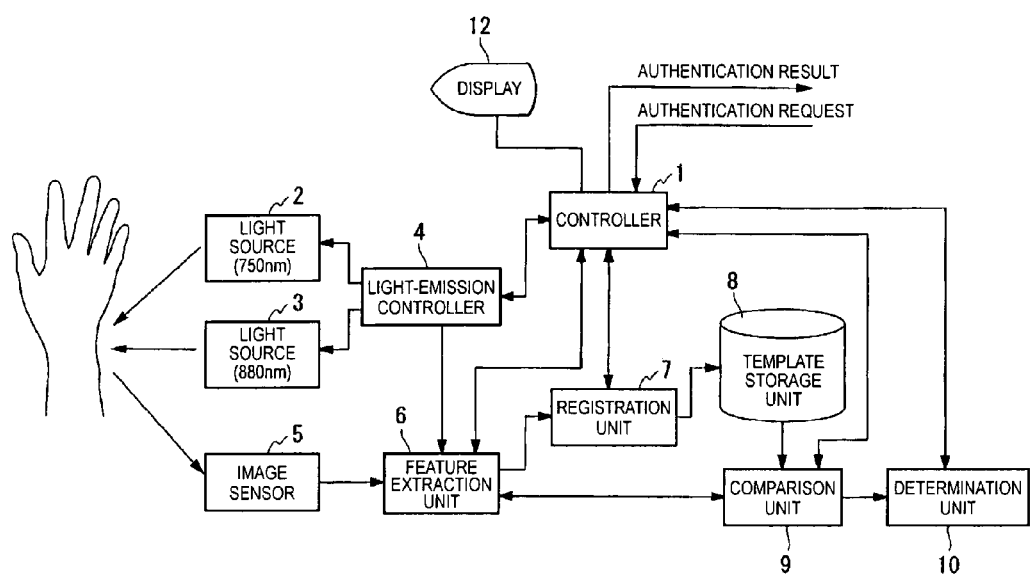
FIG. 1 is a block diagram showing a configuration of a biometric authentication system according to one embodiment of the invention.

A biometric authentication system according to an embodiment of the invention will now be described with reference to the accompanying drawings. FIG. 1 is a block diagram showing the biometric authentication system according to this embodiment. In this diagram, a controller 1 controls the operations of the biometric authentication system as a whole. A light source 2 emits light onto a living body and includes a light-emitting diode (LED) or the like that emits light with a center wavelength of 750 nm. A light source 3 emits light onto a living body like the light source 2 and includes a light-emitting diode or the like that emits light with a center wavelength of 880 nm that is longer than that of the light source 2. A light-emission controller 4 controls light emission onto a living body by providing pulse signals to the two light sources 2 and 3. An image sensor 5 acquires a biometric image by receiving light emitted from the light source 2 or light source 3 and then reflected by or transmitted through a living body. The image sensor 5 includes a charge-coupled device (CCD) or the like having a two-dimensional array light receptor and will be described in this specification as an image sensor for obtaining the respective images of arteries and veins in the proximity of a wrist as biometric images. A feature extraction unit 6 extracts features by processing images acquired by the image sensor 5. A registration unit 7 registers feature information extracted by the extraction unit 6 and to be used when performing authentication. A template storage unit 8 storages feature information registered by the registration unit 7 as template data. A comparison unit 9 compares the feature information extracted by the feature extraction unit 6 and the template data previously registered in the template storage unit 8. A determination unit 10 determines the go/no-go of authentication according to a result of the comparison between the feature information and the template data made by the comparison unit 9. A display 12 displays information toward a user. Upon receipt of an authentication request from the outside via, for example, a communication means (not shown), the controller 1 performs an authentication process, that is, it instructs the light-emission controller 4, feature extraction unit 6, comparison unit 9, and determination unit 10 to perform their respective authentication operations and then sends back a determination result obtained from the determination unit 10 to the sender of the authentication request as an authentication result.

Figure 8:
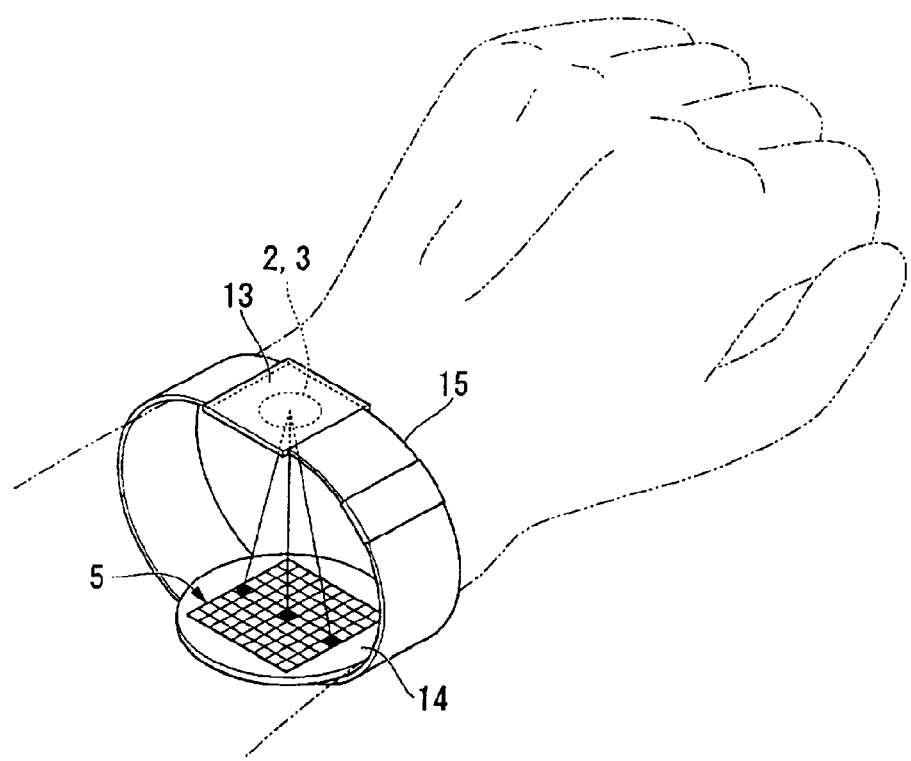
FIG. 8 is a drawing showing a state in which the biometric authentication system shown in FIG. 1 is put on the wrist.

Referring now to FIG. 8, a configuration for putting the biometric authentication system shown in FIG. 1 on a wrist will be described. As shown in FIG. 8, the biometric authentication system includes a rectangular base 13 and a circular base 14, which are coupled via a band 15. The biometric authentication system having such a configuration is put on a wrist by winding the band 15 therearound as shown in FIG. 8. The light sources 2 and 3 are provided on the rectangular base 13 and the image sensor 5 is provided on the circular base 14. The biometric authentication system is put on the wrist so that the rectangular base 13 is provided on the side of the back of a hand and so that the circuit base 14 is provided on the side of the palm of the hand. Light emitted from the light source 2 or 3 is transmitted through the wrist and received by the image sensor 5. Thus, the image sensor 5 acquires an image of a pattern of arteries or veins in the wrist.

Figure 5:
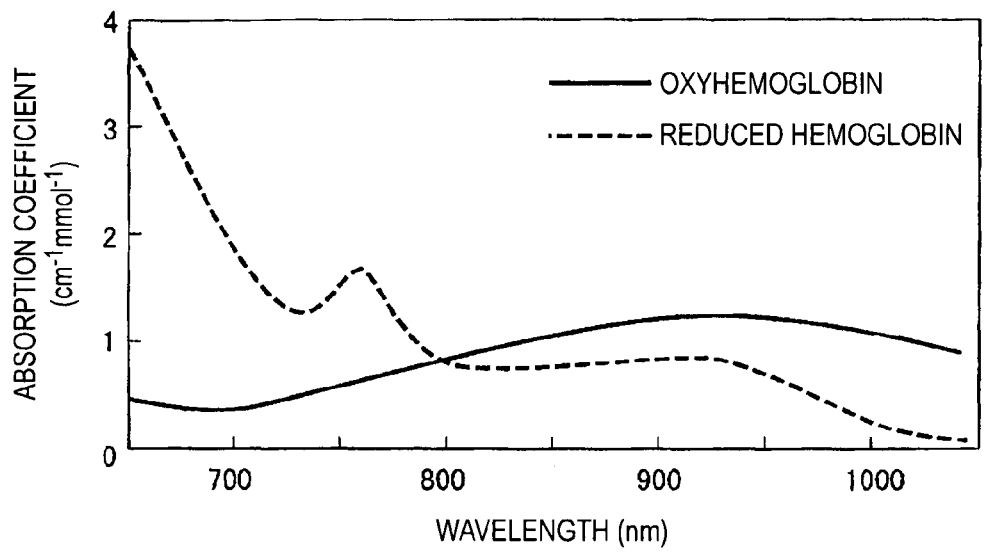
FIG. 5 is a graph showing the absorption spectrum of each hemoglobin.

Referring now to FIG. 5, an optical absorption characteristic of hemoglobin passing through a blood vessel will be described. FIG. 5 is a graph showing a spectral of oxyhemoglobin passing through an artery and that of reduced hemoglobin passing through a vein. As the wavelength of light is increased, the optical absorption coefficient of oxyhemoglogin is gradually increased, while that of reduced hemoglobin is reduced. When the wavelength of light is about 800 nm, the magnitude relation between the optical absorption coefficient of oxyhemoglogin and that of reduced hemoglobin is reversed. Therefore, if the light source emits light with a wavelength of 800 nm or less into the wrist, an image of a vein pattern is more easily obtained; if the light source emits light with a wavelength of 800 nm or more into the wrist, an image of an artery pattern is more easily obtained. According to this principle, if the light source 2 emits light with a center wavelength of 750 nm into the wrist when attempting to obtain an image of a vein pattern and if the light source 3 emits light with a center wavelength of 880 nm when attempting to obtain an image of an artery pattern, the artery pattern and vein pattern are easily separated from each other. In the biometric authentication system shown in FIG. 1, an artery pattern is used to perform positioning of the image sensor 5 and a vein pattern is used to authenticate identity.

The magnitude relation between the optical absorption coefficient of oxyhemoglobin and that of reduced hemoglogin is reversed when the light wavelength is about 800 nm, that is, the optical absorption coefficient of oxyhemoglobin is larger than that of reduced hemoglogin when the light wavelength is 800 nm or more. However, when the light wavelength reaches about 1000 nm, oxyhemoglobin significantly absorbs water. Accordingly, if an attempt is made to optically detect a artery, it is preferable to use light with a wavelength of about 800 to about 1000 nm and more preferable to use light with a wavelength of about 800 to about 900 nm.

Figure 2:
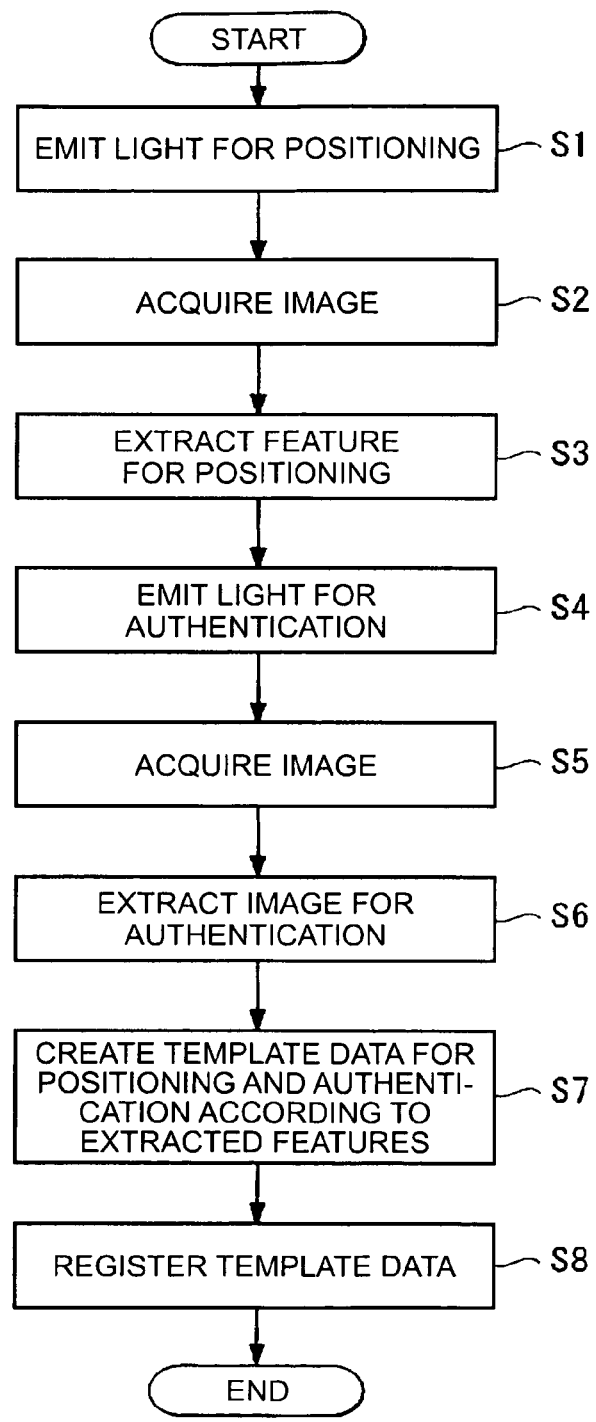
FIG. 2 is a flowchart showing operations of the biometric authentication system shown in FIG. 1.
Figure 6:
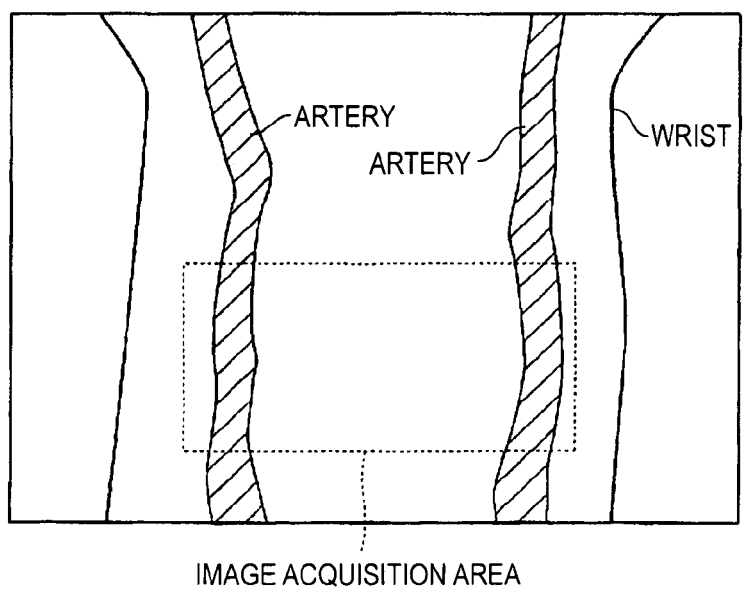
FIG. 6 is a drawing showing an image of arteries in the proximity of a wrist.

Referring now to FIG. 2, operations for registering template data (authentication data on a feature) in the template storage unit 8 will be described. Upon receipt of a registration request from the outside, the controller 1 instructs the light-emission controller 4 to emit light for positioning. Upon receipt of this instruction, the light-emission control unit 4 causes the light source 3 to emit light (step S1). Then the light-emission control unit 4 notifies the feature extraction unit 6 that the light source 3 has emitted light. Upon receipt of this notification, the feature extraction unit 6 reads image data acquired by the image sensor 5 (step S2). Then, the feature extraction unit 6 extracts a feature for positioning of the image sensor 5, from the read image data (step S3). This feature extraction process will be described later. Here, the feature extraction unit 6 extracts information on the positions of arteries passing through the wrist as shown in FIG. 6. This information on the positions of the arteries serves as feature information for positioning. Upon obtaining the feature information for positioning, the feature extraction unit 6 notifies the light-emission controller 4 that it has obtained the feature information for positioning.

Figure 7:
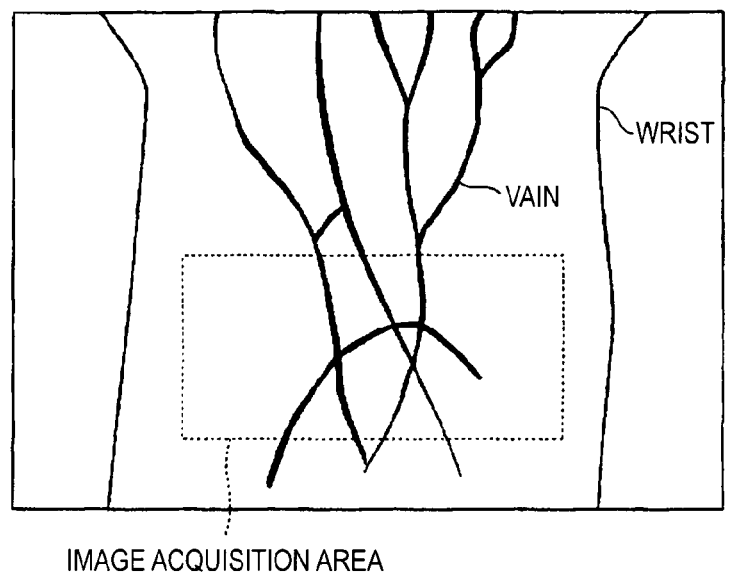
FIG. 7 is a drawing showing an image of veins in the proximity of the wrist.

Upon receipt of this notification from the feature extraction unit 6, the light-emission unit 4 causes the light source 2 to emit light (step S4). Then, the light-emission control unit 4 notifies the feature extraction unit 6 that the light source 2 has emitted light. Upon receipt of this notification, the feature extraction unit 6 reads image data acquired by the image sensor 5 (step S5). Then, the feature extraction unit 6 extracts a feature from the read image data so as to obtain feature information for authentication (step S6). This feature extraction process will be described later. Here, the feature extraction unit 6 extracts information on a pattern of veins passing through the wrist as shown in FIG. 7. This information on the pattern of veins serves as feature information for identity authentication. Upon obtaining such feature information, the feature extraction unit 6 notifies the controller 1 that it has obtained such feature information.

Subsequently, the controller 1 instructs the registration unit 7 to register the feature information for positioning (information on the positions of the arteries) and the feature information for identity authentication (information on the pattern of veins). Upon receipt of this instruction, the registration unit 7 reads the feature information for positioning and the feature information for identity authentication from the feature extraction unit 6. Then, the registration unit 7 defines the positional relation between the information on the positions of the arteries serving as feature information for positioning and the information on the pattern of veins serving as the feature information for identity authentication. Then, the registration unit 7 creates template data from this information on the positional relation, and the feature information for positioning and the feature information for identity authentication (step S7). Thereafter, the registration unit 7 registers the created template data by storing it in the template storage unit 8 (step S8). This means that template data for authenticating a user is stored in the template storage unit 8.

Figure 3:
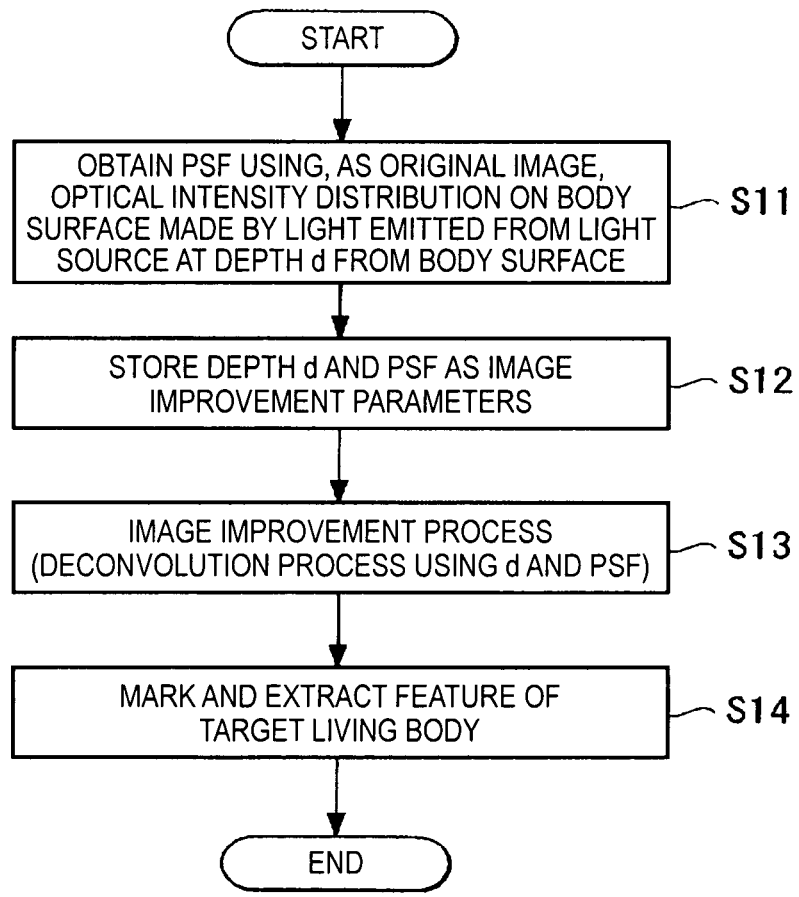
FIG. 3 is a flowchart showing operations of the biometric authentication system shown in FIG. 1.

Referring now to FIG. 3, specific operations in the feature extraction process (steps S3 and S6) shown in FIG. 2 will be described. First, the feature extraction unit 6 obtains a PSF using, as the original image, an optical intensity distribution on the body surface made by light from a light source at a depth d (distance to the image in the depth direction) from the body surface (step S11). Here, if an attempt is made to extract a feature of arteries, the depth d is set to several mm (1 to 2 mm) or less; if an attempt is made to extract a feature of veins, the depth d is set to several mm or more. The propagation of optical energy in a scatterer is represented by a transport equation. By applying diffusion approximation to this transport equation, the following equation is obtained with respect to a point source.

$$\nabla^2 U_d(r) - k_d 2 U_d(r) = -\frac{3}{4\pi} P_o (\mu_s' + \mu_a) \delta(r) \qquad \text{Equation 1}$$

provided that $$U_d(r) = \frac{1}{4\pi} \int_{4\pi} I_d(r,s) d\omega$$

and $kd = \sqrt{3\mu_a(\mu_s' + \mu_a)}$ where $U_d$ is an average diffusion optical intensity, r is a position vector, $P_o$ is all power of the point source, $\mu_s'$ is an equivalent diffusion coefficient, $\mu_a$ is an absorption coefficient, $I_d$ is diffusion optical intensity, s is a unit vector in the propagation direction of light, and $\omega$ is a solid angle.

By solving this equation, the following solution is obtained.

$$U_d(r) = \frac{3P_o}{(4\pi)^2}(\mu_s' + \mu_a)\frac{\exp(-k_d r)}{r} \qquad \text{Equation 2}$$

Figure 9:
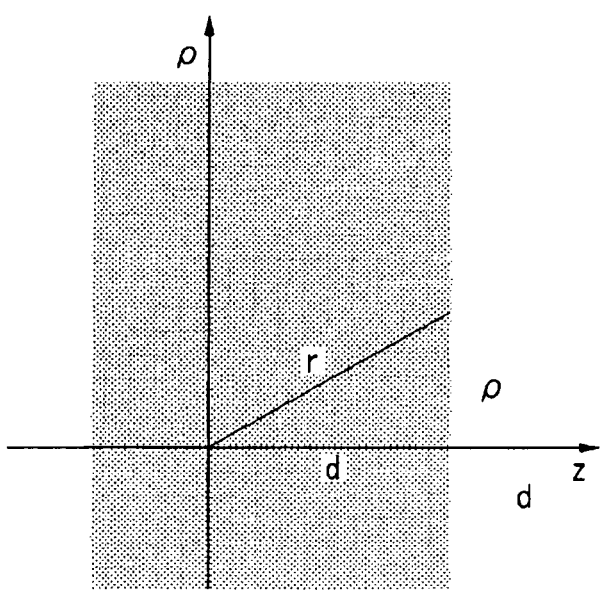
FIG. 9 is a graph showing a model to be analyzed when calculating a point spread function (PSF).

Here, an optical intensity distribution made by light emitted from the point source in the body is considered a PSF. A model to be analyzed is shown as a section of the scatterer in FIG. 9. The point source is located at the depth d (the origin point in FIG. 9) from the body surface. A circular symmetric PSFP (r) is formed as a function of a distance r from the z axis on the body surface (z=d). The PSF is derived from Equation 3 using a diffusion approximation solution obtained from Equation 2.

$$P(\rho) = \frac{3P_o}{(4\pi)^2}\left\{(\mu_s' + \mu_a) + \left(k_d + \frac{1}{\sqrt{\rho^2 + d^2}}\right)\frac{d}{\sqrt{\rho^2 + d^2}}\right\} \qquad \text{Equation 3}$$

$$\frac{\exp(-k_d\sqrt{\rho^2 + d^2})}{\sqrt{\rho^2 + d^2}}$$

Subsequently, the feature extraction unit 6 stores the depth d and the obtained PSF as image improvement parameters (step S12). Then, an image improvement process is performed using the depth d and the obtained PSF (step S13) and then a feature of the target living body (arteries or veins) is marked and extracted (step S14). The feature extraction unit 6 retains the registered depth d and the obtained PSF inside itself. This process allows the feature of the living body to be properly extracted.

Figure 4:
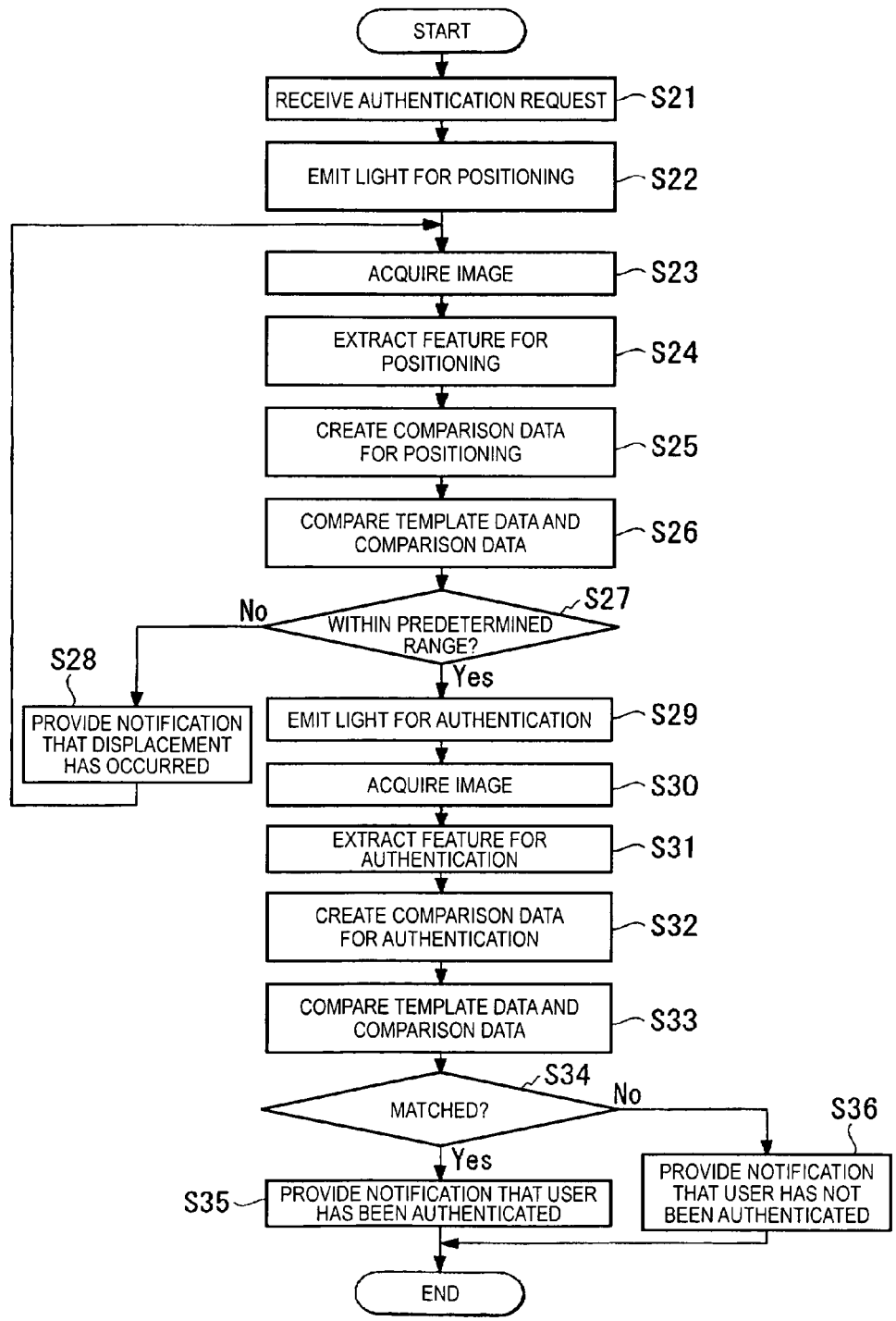
FIG. 4 is a flowchart showing operations of the biometric authentication system shown in FIG. 1.

Referring now to FIG. 4, operations performed when the biometric authentication system shown in FIG. 1 performs authentication will be described. First, the biometric authentication system receives an authentication request (step S21). Then, the controller 1 instructs the light-emission controller 4 to emit light for positioning. Upon receipt of this instruction, the light-emission controller 4 causes the light source 3 to emit light (step S22). Then, the light-emission controller 4 notifies the feature extraction unit 6 that the light source 3 has emitted light. Upon receipt of this notification, the feature extraction unit 6 reads image data acquired by the image sensor 5 (step S23). Then, the feature extraction unit 6 extracts a feature for positioning of the image sensor 5 from the read image data (step S24). Here, the feature is extracted in a manner similar to that in which a feature is registered (flowchart in FIG. 3) and will not be described in detail. Note that when performing authentication, the feature is extracted using the depth d retained at the time of registration and the PDF. As described above, use of the values at the time of registration allows the image quality to be rapidly improved.

Subsequently, the feature extraction unit 6 creates comparison data for positioning (data to be compared with the template) according to the extracted feature information for positioning (step S25). Then, the feature extraction unit 6 outputs the comparison data for positioning to the comparison unit 9. Upon receipt of this data, the comparison unit 9 compares the feature data for positioning stored in the template storage unit 8 and the comparison data for positioning outputted from the feature extraction unit 6 (step S26). According to the comparison result, the comparison unit 9 determines whether the displacement falls within a predetermined range (step S27). If the displacement does not fall within the predetermined range, the comparison unit 9 notifies the controller 1 that a displacement has occurred. Upon receipt of this notification, the controller 1 causes the display 12 to indicate that the displacement has occurred (step S28). Instead of such an indication, an audible alarm may be generated. If such a displacement has occurred, the user eliminates the displacement by putting the biometric authentication system in a proper position on the wrist.

Conversely, if the displacement falls within the predetermined range, the comparison unit 9 notifies the feature extraction unit 6 that no displacement has occurred. Upon receipt of this notification, the feature extraction unit 6 notifies the light-emission controller 4 that the positioning has been completed. Upon receipt of this notification, the light-emission controller 4 causes the light source 2 to emit light (step S29). Then, the light-emission controller 4 notifies the feature extraction unit 6 that the light source 2 has emitted light. Upon receipt of this notification, the feature extraction unit 6 reads image data acquired by the image sensor 5 (step S30). Then, the feature extraction unit 6 extracts a feature from the read image data in order to obtain feature information for authentication (step S31). This feature extraction process is similar to the above-described process (step S24) and will not be described in detail.

Then, the feature extraction unit 6 creates comparison data for authentication (data to be compared with the template) according to the extracted feature information for authentication (step S32). Then feature extraction unit 6 outputs this comparison data for authentication to the comparison unit 9. Upon receipt of this data, the comparison unit 9 compares the feature data for authentication stored in the template storage unit 8 and the comparison data for authentication outputted from the feature extraction unit 6 (step S33). Then, the comparison unit 9 outputs the comparison result to the determination unit 10. Upon receipt of this result, the determination unit 10 determines whether the feature data for authentication and the comparison data for authentication are matched, according to the degree of similarity or the like (step S34). If the determination unit 10 determines that these pieces of data are matched, it notifies the controller 1 that the user has been authenticated (step S35). If the determination unit 10 determines that these pieces of data are not matched, it notifies the controller 1 that the user has not been authenticated (step S36). According to this determination result, the controller 1 notifies the sender of the authentication request about the authentication result.

While the information on the positions of arteries is used to perform positioning in this embodiment, a wrinkle on the skin, or the like may be used for positioning.

As described above, positioning is performed before the pieces of information for authentication are compared. This allows an image acquisition element having a small image acquisition area to be used. Also, the number of pixels required becomes smaller, so the amount of image processing for making a comparison is reduced, whereby the processing speed is improved. Further, a highly-accurate authentication determination is made. Also, the quality of the obtained image is improved, so a comparison process is performed with reliability and accuracy. In particular, the process is performed according to the depth of an artery or a vein (depth of an image), so a clear image of the artery or vein is obtained. Thus, a feature is reliably extracted. Also, if a displacement has occurred, the user is provided a notification to this effect, so the user performs positioning again according to this notification. Thus, reductions in authentication success rate are prevented. Also, information to be used when performing authentication is registered with a system for comparing pieces of information for biometric authentication, so user convenience is improved. Also, a wavelength to be used is selected according to the absorption of hemoglobin, so feature information to be used for biometric authentication is efficiently extracted.

The biometric authentication system shown in FIG. 1 is also applicable to biometric authentication terminals, general-purpose small-size biometric authentication modules, commanders for keyless entry or the like, remote control units, and the like.

Also, the biometric authentication system shown in FIG. 1 may be included in electronic apparatuses such as computers, cell phones, and home electric appliances. By including the biometric authentication system in these electronic apparatuses, the use of these apparatuses is restricted, for example, only authorized users are allowed to use these apparatuses.

The above-described biometric authentication process may be performed by recording a program for realizing the respective functions of the processing units shown in FIG. 1 in a computer-readable recording medium and causing a computer system to read and execute the program recorded in the recording medium. The "computer system" here includes operating software and hardware including peripherals. The "computer-readable recording medium" refers to transportable medium such as a flexible disk, an optical-magnetic disk, a read-only memory (ROM), or a compact disc-read-only memory (CD-ROM), or a storage device included in a computer system, such as a hard disk. Such a computer-readable recording media may be a medium that retains a program in a given time period, such as a volatile memory (random-access memory (RAM)) in a computer system that serves as a server or a client when a program is transmitted via a network such as the Internet or via a communication line such as a telephone line.

The above-described program may be transmitted from a computer system whose storage device or the like stores this program, to another computer system via a transmission medium or using transmission waves in the transmission medium. The "transmission medium" for transmitting the program refers to a medium having a function of transmitting information as a network (communication network) such as the Internet or a communication line such as a telephone line does. Also, the above-described program may be a program for realizing a part of the above-described functions. Further, the above-described program may be a program that realizes the above-described functions by being combined with a program previously recorded in a computer system, that is, may be a differential file (difference program).

What is claimed is:

1. A biometric authentication system, comprising:
   an image acquisition unit for acquiring an image of a living body;
   a first light source that irradiates a first light to the living body;
   a second light source that irradiates a second light to the living body, wherein a center of wavelength distribution of the first light is different than a center of wavelength distribution of the second light;
   a light-emission controller configured to control light emission onto the living body by providing pulse signals to the first light source and the second light source;
   an authentication information storage unit for, when the light is emitted by the light source, setting a predetermined distance for a first distance to a first image acquired by the image acquisition unit in a depth direction so that quality of the first image is improved, extracting a first feature for biometric authentication from the first image whose quality has been improved, and storing authentication information regarding the first feature, wherein the first image is acquired by receiving a third light from the living body, the third light being a light through a first portion of the living body based on the first light or the second light;

a feature extraction unit for, when the light is emitted by the light source when performing authentication, setting the predetermined distance for a second distance to a second image acquired by the image acquisition unit in the depth direction so that quality of the second image is improved, and extracting a second feature for biometric authentication from the second image whose quality has been improved, wherein the second image is acquired by receiving a fourth light from the living body, the fourth light being a light through a second portion of the living body based on the first light or the second light; and a comparison unit for comparing the authentication information regarding the first feature and authentication information regarding the second feature;

wherein the quality of the first image and the quality of the second image is improved by performing a deconvolution process using a point spread function based on the predetermined distance, and wherein the point spread function is a circular symmetric function of distance from a z axis on the living body and is derived from the following equation:

$$P(\rho) = \frac{3P_o}{(4\pi)^2}\left\{(\mu'_s + \mu_a) + \left(k_d + \frac{1}{\sqrt{\rho^2+d^2}}\right)\frac{d}{\sqrt{\rho^2+d^2}}\right\}\frac{\exp\left(-k_d\sqrt{\rho^2+d^2}\right)}{\sqrt{\rho^2+d^2}}.$$

2. The biometric authentication system according to claim 1, wherein
the first and second distances in the depth direction are each a distance from a skin to a vein or an artery used to perform biometric authentication.

3. The biometric authentication system according to claim 1, wherein the light from the first and second light source has a wavelength of about 800 nm to about 900 nm.

4. The biometric authentication system according to claim 1, wherein the light-emission controller is further configured to notify the feature extraction unit that the first or second light source has emitted light.

5. A method for performing biometric authentication in a biometric authentication system including an image acquisition unit for acquiring an image of a living body, the method comprising;
providing pulse signals from a light emission controller to a first and a second light source such that the first light source irradiates a first light to the living body and the second light source irradiates a second light to the living body;
when light is emitted by the first and second light sources, setting a predetermined distance for a first distance to a first image acquired by the image acquisition unit in a depth direction so that quality of the first image is improved, extracting a first feature for biometric authentication from the first image whose quality has been improved by performing a deconvolution process using a point spread function based on the predetermined distance, and storing authentication information regarding the first feature, wherein the first image is acquired by receiving a third light from the living body, the third light being a light through a first portion of the living body based on the first light or the second light;

when light is emitted by the first and second light sources when performing authentication, setting the predetermined distance for a second distance to a second image acquired by the image acquisition unit in the depth direction so that quality of the second image is improved, and extracting a second feature for biometric authentication from the second image whose quality has been improved by performing a deconvolution process using a point spread function based on the predetermined distance, wherein the second image is acquired by receiving a fourth light from the living body, the fourth light being a light through a second portion of the living body based on the first light or the second light; and comparing the authentication information regarding the first feature and authentication information regarding the second feature, wherein a center of wavelength distribution of the first light is different than a center of wavelength distribution of the second light, and wherein the point spread function is a circular symmetric function of distance from a z axis on the body and is derived from the following equation:

$$P(\rho) = \frac{3P_o}{(4\pi)^2}\left\{(\mu'_s + \mu_a) + \left(k_d + \frac{1}{\sqrt{\rho^2+d^2}}\right)\frac{d}{\sqrt{\rho^2+d^2}}\right\}\frac{\exp\left(-k_d\sqrt{\rho^2+d^2}\right)}{\sqrt{\rho^2+d^2}}.$$

6. A biometric authentication system, comprising:
an image acquisition unit that acquires an image of a living body;
a first light source that irradiates a first light to the living body;
a second light source that irradiates a second light to the living body;
a light-emission controller configured to control light emission onto the living body by providing pulse signals to the first light source and the second light source;
a feature extraction unit that extracts a first feature from a first image data and a second feature from a second image data;
an authentication information storage unit that stores first feature; and
a comparison unit that compares the first feature and the second feature,
the first image data being acquired by the image acquisition unit by receiving a third light from the living body, the third light being a light through a first portion of the living body based on the first light or the second light,
the second image data being acquired by the image acquisition unit by receiving a fourth light from the living body, the fourth light being a light through a second portion of the living body based on the first light or the second light,
a center of wavelength distribution of the first light being different from a center of wavelength distribution of the second light,
the first feature being acquired by performing a deconvolution process of the first image data using a point spread function,
the second feature being acquired by performing a deconvolution process of the second image data using a point spread function, and wherein the point spread function is a circular symmetric function of distance from a z axis on the living body and is derived from the following equation:

$$P(\rho) = \frac{3P_o}{(4\pi)^2}\left\{(\mu'_s + \mu_a) + \left(k_d + \frac{1}{\sqrt{\rho^2 + d^2}}\right)\frac{d}{\sqrt{\rho^2 + d^2}}\right\}\frac{\exp(-k_d\sqrt{\rho^2 + d^2})}{\sqrt{\rho^2 + d^2}}.$$

7. A biometric authentication system according to claim 6, the first light being used to perform positioning, the second light being used to perform authenticate identify.

8. The biometric authentication system according to claim 6,
wherein the light-emission controller is further configured to notify the feature extraction
unit that the first or second light source has emitted light.

9. A method for performing biometric authentication, comprising:
selecting a wavelength of light to irradiate a living body according to the absorption of hemoglobin therein;
irradiating a first light having a selected wavelength to a living body;
irradiating a second light having a selected wavelength to the living body;
acquiring a first image data by receiving a third light from the living body, the third light being a light through a first portion of the living body based on the first light or the second light;
acquiring a first feature by performing a deconvolution process of the first image data;
emitting the light to the living body;
acquiring a second image data by receiving a fourth light from the living body, the fourth light being a light through a second portion of the living body based on the first light or the second light;
acquiring a second feature by performing a deconvolution process of the second image data using a point spread function; and
comparing the first feature and the second feature, wherein a center of wavelength distribution of the first light is different than a center of wavelength distribution of the second light,
wherein the point spread function is a circular symmetric function of distance from a z axis on the living body and is derived from the following equation:

$$P(\rho) = \frac{3P_o}{(4\pi)^2}\left\{(\mu'_s + \mu_a) + \left(k_d + \frac{1}{\sqrt{\rho^2 + d^2}}\right)\frac{d}{\sqrt{\rho^2 + d^2}}\right\}\frac{\exp(-k_d\sqrt{\rho^2 + d^2})}{\sqrt{\rho^2 + d^2}}.$$

* * * * *